(12) United States Patent
Aoyama et al.

(10) Patent No.: US 8,511,810 B2
(45) Date of Patent: Aug. 20, 2013

(54) INKJET RECORDING METHOD AND RECORDING PRODUCT

(75) Inventors: Tetsuya Aoyama, Shiojiri (JP); Hidehiko Komatsu, Chino (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 12/384,394

(22) Filed: Apr. 3, 2009

(65) Prior Publication Data

US 2009/0258203 A1 Oct. 15, 2009

(30) Foreign Application Priority Data

Apr. 3, 2008 (JP) ................................ 2008-096821
Mar. 25, 2009 (JP) ................................ 2009-073814

(51) Int. Cl.
*B41J 2/01* (2006.01)

(52) U.S. Cl.
USPC .............................. 347/100; 347/95; 347/101

(58) Field of Classification Search
USPC ............ 347/100, 95, 96, 101, 102, 103, 105; 106/31.27, 31.6, 31.13; 523/160, 161
See application file for complete search history.

(56) References Cited

U.S. PATENT DOCUMENTS

| | | | | |
|---|---|---|---|---|
| 6,086,197 A | * | 7/2000 | Kubota et al. | 347/100 |
| 6,142,618 A | * | 11/2000 | Smith et al. | 347/85 |
| 6,286,953 B1 | * | 9/2001 | Takemoto et al. | 347/100 |
| 6,824,262 B2 | * | 11/2004 | Kubota et al. | 347/100 |
| 7,416,592 B2 | | 8/2008 | Kitamura et al. | |
| 7,553,357 B2 | | 6/2009 | Sao et al. | |
| 2006/0264533 A1 | * | 11/2006 | Kataoka et al. | 347/100 |
| 2007/0197685 A1 | * | 8/2007 | Aruga et al. | 523/160 |
| 2007/0261597 A1 | * | 11/2007 | Sao et al. | 106/38 |
| 2007/0263058 A1 | * | 11/2007 | Sao et al. | 347/100 |

FOREIGN PATENT DOCUMENTS

| | | |
|---|---|---|
| JP | 03-240557 | 10/1991 |
| JP | 03-240558 | 10/1991 |
| JP | 05-202328 | 8/1993 |
| JP | 06-106735 | 4/1994 |
| JP | 09-207424 | 8/1997 |
| JP | 10-195404 | 7/1998 |
| JP | 2000-272220 A | 10/2000 |
| JP | 2001-138629 A | 5/2001 |
| JP | 2001-262022 A | 9/2001 |
| JP | 2001-315425 | 11/2001 |
| JP | 2003-326829 A | 11/2003 |
| JP | 2005-007578 A | 1/2005 |
| JP | 2005-096365 A | 4/2005 |
| JP | 2005-225114 A | 8/2005 |
| JP | 2007-302804 A | 11/2007 |
| JP | 2007-302811 A | 11/2007 |

\* cited by examiner

*Primary Examiner* — Manish S Shah
(74) *Attorney, Agent, or Firm* — Nutter McClennen & Fish LLP; John J. Penny, Jr.; Lydia G. Olson

(57) ABSTRACT

There is provided an inkjet recording method in which two liquids are printed and which can perform inkjet ejection, in which the inkjet recording method provides a high-quality image using a reaction liquid having excellent storage stability, ejection stability, and recoverability from clogging on a recording medium having an absorbing layer of a paper support with low water absorption, the image having excellent abrasion resistance. An inkjet recording method includes the step of attaching a reaction liquid and an ink composition to a recording medium to perform printing, in which the recording medium has an absorbing layer of a paper support in which the amount of water absorbed within 30 msec$^{1/2}$ from the start of contact in the Bristow method is 30 ml/m$^2$ or less, the reaction liquid contains a polyether-modified polysiloxane-based compound and at least one selected from a polyvalent metal salt, polyallylamine, and polyallylamine derivatives, and the ink composition contains water, a colorant, and resin emulsion particles.

8 Claims, 6 Drawing Sheets

INKJET RECORDING METHOD AND RECORDING PRODUCT

BACKGROUND OF THE INVENTION

1. Field of the Invention

The present invention relates to an inkjet recording method and a recording product, more specifically, to an inkjet recording method including attaching two liquids, i.e., a reaction liquid and an ink composition, to a recording medium having an absorbing layer of a paper support with low water absorption to perform printing, and a recording product.

2. Invention of Related Art

An inkjet recording method is a printing method in which droplets of an ink composition are allowed to fly and deposited on a recording medium such as paper to perform printing. The inkjet recording method facilitates a reduction in size, an increase in operating speed, a reduction in noise, a reduction in power consumption, and color printing. Furthermore, the inkjet recording method has a feature in which non-contact printing can be performed for a recording medium, and is thus used for various applications. For example, various images are formed by recording apparatuses using the inkjet recording method.

In particular, for industrial applications, images formed by full-color inkjet recording method can have good quality comparable to those of multicolor printing using printing plates and silver salt photography. In the case where small batches of many different prints are produced, use of the inkjet recording method has recently been growing because the inkjet recording method is inexpensive compared with usual multicolor printing.

In general, the ink composition used in the ink jet recording method is an aqueous ink composition which contains water as a main component, a colorant, and a humectant for preventing clogging, and other components and which has a low viscosity and a high water content. Thus, usually, high-water-absorption specialized inkjet paper is used as a recording medium.

High-water-absorption specialized inkjet paper includes an absorption layer composed of fine powdered silica or alumina on a surface of the paper. The absorption layer can absorb ink instantaneously even when recording is performed with an ink composition having a high water content, so that it is possible to achieve satisfactory print quality free from, for example, feathering or color bleeding. However, for industrial printing users who want to achieve a further reduction in print cost, the use of expensive fine powdered silica or alumina limits applications.

On the other hand, an example of an inexpensive medium is coated paper (also referred to as "coated printing paper", "coated paper for printing", and "proofing base") as a low-water-absorption recording medium. Coated paper is a combined sheet in which coating color, a type of paint, is applied on either or both sides of base paper in order to improve printability. Coated paper is specifically used as printing paper. Coated paper is used for a recording method using a high-viscosity ink composition (ink with a low water content) and an ink composition containing a solvent. Demands for several millions of tons of coated paper every year result in mass-production equipment, thus leading to the supply of high-quality coated paper at very low cost.

Although the high-viscosity low-water-content ink composition provides a good-quality image on a low-water-absorbable or non-absorbable recording medium, it is technically difficult to ensure reliability such as recoverability from clogging and ejection stability. Furthermore, as the inkjet recording method, printing apparatuses and printing methods are limited. In addition, the ink composition containing a solvent is composed of a low-water-solubility or insoluble raw material (e.g., a lipophilic organic solvent such as toluene) and thus provides excellent image quality, abrasion resistance, and durability and has an excellent quick drying property. However, some organic solvents contained therein may be toxic for animals and plants and may adversely affect the health of personnel due to air pollution by high-volatile organic solvent (VOC); hence, it is inconvenient to handle such solvents from the viewpoints of achieving safety and environmental friendliness.

Meanwhile, an aqueous low-viscosity ink composition commonly used in inkjet recording is easy to ensure safety, environmental friendliness, and ejection reliability for an inkjet recording method. However, when recording is performed on a recording medium such as coated paper that does not include a thick absorbing layer unlike the specialized inkjet paper, a deterioration in image quality, e.g., feathering, color bleeding, and uneven printing, reductions in abrasion resistance and quick drying property are caused because of its poor water absorption. It is thus considered that coated paper is not suitable as a recording medium.

On the other hand, a new ink jet recording method has been recently proposed. The new method includes applying a polyvalent metal salt solution onto a recording medium and then applying an ink composition containing a dye having at least one carboxyl group (Patent Document 1). According to this method, polyvalent metal ions combine with the dye to form an insoluble composite which can provide an image having water resistance and a high quality free from color bleeding.

Furthermore, an ink jet recording method has been proposed in which a color ink containing at least a surfactant or a penetrable solvent and a salt for imparting a penetrating property is used in combination with a black ink which cooperates with the salt to cause thickening or agglomeration, thereby providing a high-quality color image having a high image density and free from color bleeding (Patent Document 2). More specifically, in this method, two liquids, i.e., a first liquid containing a salt and a second liquid of an ink composition, are printed to provide a good image.

In addition, other ink jet recording methods in which two liquids are printed have been proposed (Patent Document 3 to 7).

Here, the following items are required for the inkjet recording method in which two liquids are printed on a low-water-absorption recording medium (e.g., coated paper):
1) A reaction liquid can be evenly applied to a low-water-absorption recording medium such as coated paper.
2) Reaction of the reaction liquid and an ink composition prevents the occurrence of feathering, color bleeding, and uneven printing.
3) A recording product has excellent abrasion resistance (the two liquids have excellent adhesion and bondability to the recording medium).
4) After the application of the liquids to the recording medium, the liquids can be readily dried.
5) The characteristics of the reaction liquid and the ink composition are not degraded with time (excellent storage stability)
6) The reaction liquid and the ink composition can be ejected in an inkjet manner, and a head is not clogged in practical use.

In the related art, an inkjet recording method that satisfies all the above requirements is not provided. In particular, disadvantageously, in the case where the reaction liquid does not have uniform wettability for the recording medium, the concentration distribution of a colorant in the ink composition printed after printing the reaction liquid is liable to occur, i.e., uneven printing is liable to be performed. Furthermore, in the case where the reaction liquid does not have uniform wettability, agglomerates of the reaction liquid and the ink composition are unevenly distributed, so that the resulting resin film is uneven. This increases the resistance when the film is rubbed, thereby disadvantageously reducing abrasion resistance.

PRIOR ART DOCUMENT

Patent Document

[Patent Document 1] JP-A-5-202328
[Patent Document 2] JP-A-6-106735
[Patent Document 3] JP-A-3-240557
[Patent Document 4] JP-A-3-240558
[Patent Document 5] JP-A-9-207424
[Patent Document 6] JP-A-10-195404
[Patent Document 7] JP-A-2001-315425

SUMMARY OF THE INVENTION

As described above, a combination of the advantages of the inkjet recording method, i.e., simple and small, an inexpensive recording medium such as coated paper (low-water-absorption recording medium) having excellent printability, and high-safety aqueous ink composition has room for improvement yet even though it has been desired in this industry.

Thus, It is an object of the present invention to provide an inkjet recording method in which two liquids are printed and which can perform inkjet ejection and a recording product, in which the inkjet recording method provides a high-quality image free from feathering, color bleeding, uneven printing, and the like using a reaction liquid having excellent storage stability, ejection stability, and recoverability from clogging on a recording medium having an absorbing layer of a paper support with low water absorption, and the recording product has excellent abrasion resistance.

The inventors have conducted intensive studies and have found that the foregoing object is achieved by an inkjet recording method including the step of attaching a reaction liquid and an ink composition to a recording medium to perform printing, in which the recording medium has an absorbing layer of a paper support in which the amount of water absorbed within 30 msec$^{1/2}$ from the start of contact in the Bristow method is 30 ml/m$^2$ or less, the reaction liquid contains a polyether-modified polysiloxane-based compound and at least one selected from a polyvalent metal salt, polyallylamine, and polyallylamine derivatives, and the ink composition contains water, a colorant, and resin emulsion particles. These findings have led to the completion of the present invention.

The present invention is described below.

Application Example 1

An inkjet recording method includes the step of attaching a reaction liquid and an ink composition to a recording medium to perform printing, in which the recording medium has an absorbing layer of a paper support in which the amount of water absorbed within 30 msec$^{1/2}$ from the start of contact in the Bristow method is 30 ml/m$^2$ or less, the reaction liquid contains a polyether-modified polysiloxane-based compound and at least one selected from a polyvalent metal salt, polyallylamine, and polyallylamine derivatives, and the ink composition contains water, a colorant, and resin emulsion particles.

Application Example 2

In the inkjet recording method described in [Application Example 1], the polyvalent metal salt is at least one selected from sulfate, nitrate, and carboxylate.

Application Example 3

In the inkjet recording method described in [Application Example 1] or [Application Example 2], the polyether-modified polysiloxane-based compound is a polyether-modified polysiloxane-based compound represented by formula (1):

[Chem. 1]

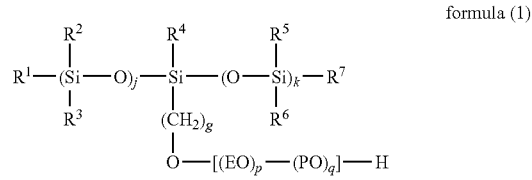

formula (1)

(wherein in formula (1), $R^1$ to $R^7$ each independently represent an alkyl group having 1 to 6 carbon atoms; j, k, and g each independently represent an integer of 1 or more; EO represents an ethyleneoxy group; PO represents a propyleneoxy group; and p and q each represent an integer of zero or more, provided that p+q represents an integer of 1 or more, any order of EO and PO in brackets may be used, and EO and PO may be arranged in a random or block fashion).

Application Example 4

In the inkjet recording method described in any one of [Application Example 1] to [Application Example 3], the reaction liquid further contains a long-chain alkyl glycol ether.

Application Example 5

In the inkjet recording method described in [Application Example 4], the proportion of the long-chain alkyl glycol ether in the reaction liquid is 10% by weight or less.

Application Example 6

In the inkjet recording method described in any one of [Application Example 1] to [Application Example 5], the reaction liquid further contains diacetylene tetraol represented by formula (2):

[Chem. 2]

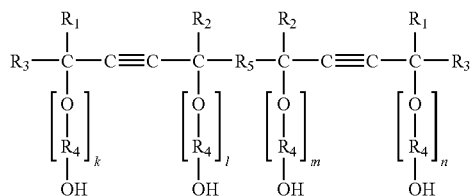

formula (2)

(wherein in formula (2), $R_1$'s and $R_2$'s each independently represent an alkyl group having 1 to 8 carbon atoms; $R_3$'s each independently represent a hydrogen atom or a methyl group; —O—$R_4$-'s each independently represent oxyethyl, oxypropyl, or oxybutyl; $R_5$ represents a divalent linking group; k, l, m, and n each represent an integer of 1 to 100).

Application Example 7

In the inkjet recording method described in any one of [Application Example 1] to [Application Example 6], the reaction liquid further contains 1,2-alkanediol.

Application Example 8

In the inkjet recording method described in any one of [Application Example 1] to [Application Example 7], the reaction liquid further contains a polyhydric alcohol and/or a saccharide as a humectant, and the proportion of the polyhydric alcohol and/or saccharide in the reaction liquid is in the range of 0.1% to 10% by weight.

Application Example 9

In the inkjet recording method described in any one of [Application Example 1] to [Application Example 8], the colorant in the ink composition is a pigment.

Application Example 10

In the inkjet recording method described in any one of [Application Example 1] to [Application Example 9], the step of attaching the reaction liquid and the ink composition to the recording medium is performed in a single pass.

Application Example 11

The inkjet recording method described in any one of [Application Example 1] to [Application Example 10] further includes the step of heating the recording medium having the reaction liquid and/or the ink composition at 40° C. to 150° C.

Application Example 12

A recording product recorded by the inkjet recording method described in any one of [Application Example 1] to [Application Example 11].

According to the present invention, it is possible to provide an inkjet recording method in which two liquids are printed and which can perform inkjet ejection and a recording product, in which the inkjet recording method provides a high-quality image free from feathering, color bleeding, uneven printing, and the like using a reaction liquid having excellent storage stability, ejection stability, and recoverability from clogging on a recording medium having an absorbing layer of a paper support with low water absorption, and the recording product has excellent abrasion resistance.

DESCRIPTION OF EXEMPLARY EMBODIMENTS

Figure 1:
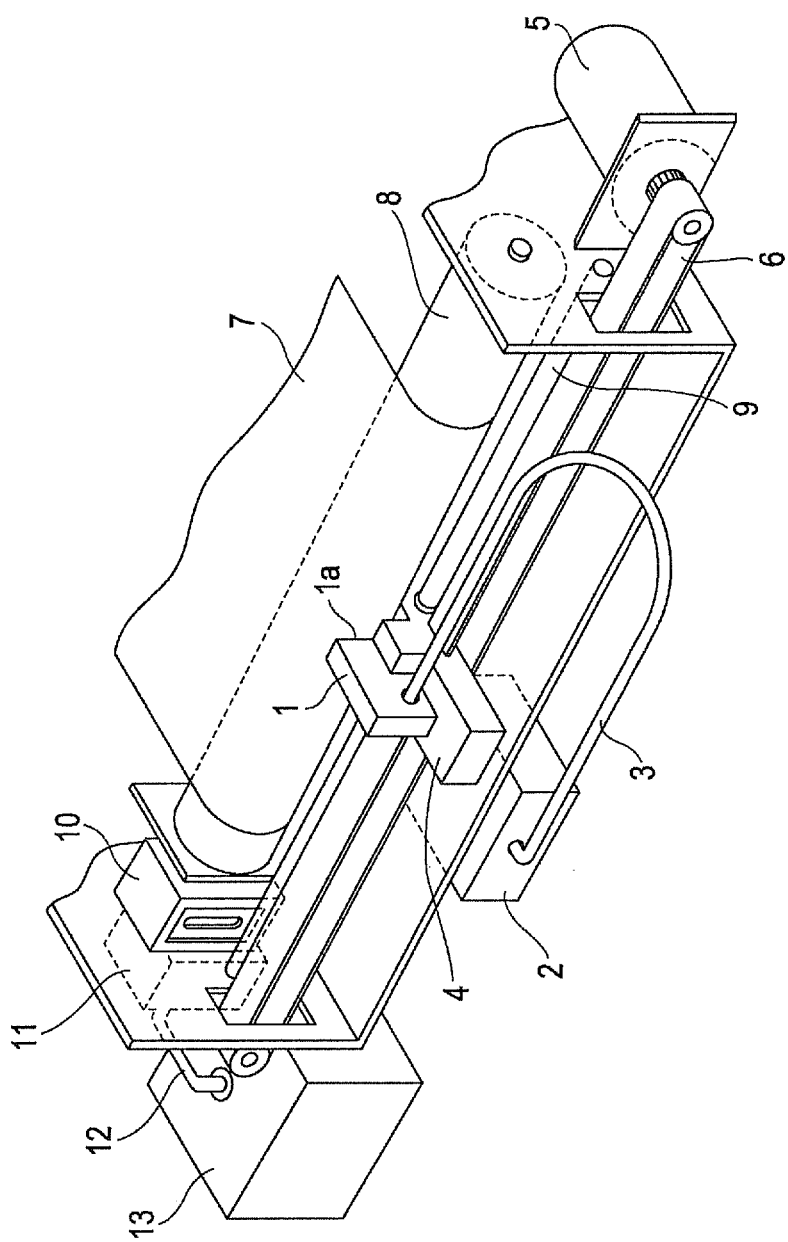
FIG. 1 shows an inkjet recording apparatus with which a method according to the present invention is performed.

The present invention will be described in more detail below on the basis of preferred embodiments.

An inkjet recording method according to this embodiment is an inkjet recording method in which a reaction liquid and an ink composition are attached to a recording medium to perform printing. The recording medium has an absorbing layer of a paper support in which the amount of water absorbed within 30 msec$^{1/2}$ from the start of contact in the Bristow method is 30 ml/m$^2$ or less. The reaction liquid contains a polyether-modified polysiloxane-based compound and at least one selected from polyvalent metal salts, polyallylamine, and polyallylamine derivatives. The ink composition contains water, a colorant, and resin emulsion particles.

[Recording Medium]

The inkjet recording method according to the embodiment is
useful when a recording medium having an absorbing layer of a paper support with low water absorption is used as a recording medium.

In this embodiment, the "recording medium having an absorbing layer of a paper support with low water absorption" is used to indicate a recording medium having an absorbing layer of a paper support in which the amount of water absorbed within 30 msec$^{1/2}$ from the start of contact in the Bristow method is 30 ml/m$^2$ or less. In this embodiment, any coated paper (also referred to as "coated printing paper", "coated paper for printing", and "proofing base") as printing paper commonly used for letterpress, lithography (e.g., offset printing), or intaglio printing (e.g., gravure printing) can be used. The coated paper includes normal coated paper, cast-coated paper, and matte-coated paper. Furthermore, coated printing paper defined in JIS P0001 No. 6122 and OK Topcoat paper defined in JIS P0001 No. 6059 are included.

The Bristow method is the most popular method as a method for measuring the amount of liquid absorbed in a short period of time and is also employed by Japan Technical Association of the Pulp and Paper Industry (J' TAPPI). Details of the test method are described in "a test method for liquid absorption of paper and paperboard" reported in J' TAPPI No. 51.

[Reaction Liquid]

The reaction liquid according to the present invention contains a polyether-modified polysiloxane-based compound and at least one selected from polyvalent metal salts, polyallylamine, and polyallylamine derivatives. Each of the "polyvalent metal salts, polyallylamine, and polyallylamine derivatives" has a function as a reactant and can break the state of dispersion or solution of, for example, the colorant and the resin emulsion particles in the ink composition, resulting in agglomeration of these components.

[Polyvalent Metal Salt]

The polyvalent metal salts that can be used for the reaction liquid are composed of divalent or higher valent metal ions and anions connected to these polyvalent metal ions and are soluble in water. Specific examples of the polyvalent metal ions include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $F^{3+}$, and $Cr^{3+}$. Examples of the anions include $Cl^-$, $NO_3^-$, $I^-$, $Br^-$, $ClO_3^-$, and $CH_3COO^-$.

Among these salts, a metal salt composed of $Ca^{2+}$ or $Mg^{2+}$ provides suitable results from two viewpoints of the pH of the reaction liquid and the quality of printed matter to be obtained.

The proportion of the polyvalent metal salt in the reaction liquid may be appropriately determined to the extent that print quality and the effect of preventing clogging are provided. The proportion of the polyvalent metal salt in the reaction liquid is preferably in the range of about 0.1% to about 40% by weight and more preferably about 2% to 25% by weight.

According to a preferred embodiment of the present invention, the polyvalent metal salt contained in the reaction liquid is composed of divalent or higher valent metal ions and sulfate ions, nitrate ions, or carboxylate ions bonded to the polyvalent metal ions.

Here, the carboxylate ions are preferably ions derived from saturated aliphatic monocarboxylic acids each having 1 to 6 carbon atoms or carbocyclic monocarboxylic acids each having 7 to carbon atoms. Preferred examples of the derived from saturated aliphatic monocarboxylic acids having 1 to 6 carbon atoms include formic acid, acetic acid, propionic acid, butyric acid, isobutyric acid, valeric acid, isovaleric acid, pivalic acid, and hexanoic acid. In particular, formic acid and acetic acid are preferred.

A hydrogen atom of the saturated aliphatic hydrocarbon group of the monocarboxylic acid may be substituted by a hydroxy group. A preferred example of such a carboxylic acid is lactic acid.

Preferred examples of carbocyclic monocarboxylic acids each having 6 to 10 carbon atoms include benzoic acid and naphthoic acid. Benzoic acid is more preferred.

[Polyallylamine and Polyallylamine Derivatives]

Polyallylamine and polyallylamine derivatives that can be used in the reaction liquid are cationic polymers that are soluble in water and positively charged in water.

Polyallylamine and/or polyallylamine derivatives that can be used in the reaction liquid of the present invention are not particularly limited. Known polyallylamine and/or polyallylamine derivatives may be appropriately selected and used. Examples thereof include polyallylamine hydrochloride, polyallylamineamide sulfate, polyallylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamineamide sulfate, polymethyldiallylamine acetate, polydiallyldimethylammonium chloride, diallylamine acetate-sulfur dioxide copolymers, diallylmethylethylammoniummethyl sulfate-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers.

As such polyallylamine and/or polyallylamine derivatives, commercially available polyallylamine and/or polyallylamine derivatives may be used. Examples thereof include "PAA-HCl-01", "PAA-HCl-03", "PAA-HCl-05", "PAA-HCl-3L", "PAA-HCl-10L", "PAA-H-HCL", "PAA-SA", "PAA-01", "PAA-03", "PAA-05", "PAA-08", "PAA-15", "PAA-15C", "PAA-25", "PAA-H-10C", "PAA-D11-HCL", "PAA-D41-HCL", "PAA-D19-HCL", "PAS-21CL", "PAS-M-1L", "PAS-M-1", "PAS-22SA", "PAS-M-1A", "PAS-H-1L", "PAS-H-5L", "PAS-H-10L", "PAS-92", "PAS-92A", "PAS-J-81L", and "PAS-J-81" (trade name, manufactured by Nitto Boseki Co., Ltd.); and "HymoNeo-600", "Hymoloc Q-101", "Hymoloc Q-311", "Hymoloc Q-501", "Himax SC-505", and "Himax SC-505" (trade name, manufactured by HYMO Co., Ltd).

The proportion of polyallylamine and polyallylamine derivatives in the reaction liquid is preferably in the range of 0.5% to 10% by weight from the viewpoints of print quality and the prevention of clogging.

[Polyether-Modified Polysiloxane-Based Compound]

The reaction liquid of the present invention contains a polyether-modified polysiloxane-based compound. Use of the reaction liquid containing the polyether-modified polysiloxane-based compound reduces the surface tension of the reaction liquid, thereby contributing to improvement in the wettability to a recording medium and permitting uniform application. An ink composition can also be uniformly applied after the reaction liquid has been applied, thus providing suppression of uneven printing and improvement in abrasion resistance. Furthermore, the polyether-modified polysiloxane-based compound also serves as a penetrant. Thus, another advantage is the fact that the drying property of printed matter is also improved. Moreover, for color images, advantageously, uneven color mixing in boundary areas of different colors, i.e., color bleeding, can be effectively prevented.

As the polyether-modified polysiloxane-based compound, a compound represented by formula (1) described below is preferred because when the reaction liquid is applied to, in particular, a low-water-absorption recording medium such as coated paper, irregularities of an applied surface can be effectively smoothed out and uniformized, thereby further suppressing uneven printing and improving abrasion resistance.

[Chem. 3]

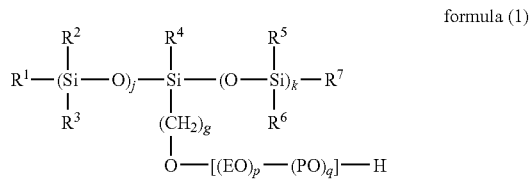

formula (1)

(wherein in formula (1), $R^1$ to $R^7$ each independently represent an alkyl group having 1 to 6 carbon atoms; j, k, and g each independently represent an integer of 1 or more; EO represents an ethyleneoxy group; PO represents a propyleneoxy group; and p and q each represent an integer of zero or more, provided that p+q represents an integer of 1 or more, any order of EO and PO in brackets may be used, and EO and PO may be arranged in a random or block fashion).

In the polyether-modified polysiloxane-based compound of formula (1), $R^1$ to $R^7$ each independently represent an alkyl group having 1 to 6 carbon atoms and preferably a methyl group. j, k, and g each independently represent an integer of 1 or more and preferably 1 or 2. p and q each represent an integer of zero or more, provided that p+q represents an integer of 1 or more and preferably 2 to 4.

Furthermore, as the compound represented by formula (1), for example, a compound that meets j=k+g is preferred. Moreover, as the compound represented by formula (1), a compound is preferred in which each of $R^1$ to $R^7$ represents a methyl group, j represents 2, k represents 1, g represents 1, p represents an integer of 1 or more, and q represents zero.

As the compound represented by formula (1), a commercially available product can be used. Examples of the commercially available product that can be used include BYK-345, BYK-346, BYK-347, BYK-348, and UV3530 (trade name, manufactured by BYK-Chemie Japan K.K).

The reaction liquid may contain one or two or more polyether-modified polysiloxane-based compounds and preferably has a polyether-modified polysiloxane-based compound content of 0.05% to 3% by weight and more preferably 0.1% to 2% by weight.

[Long-Chain Alkyl Glycol Ether]

The reaction liquid of the present invention may further contain a long-chain alkyl glycol ether for the purpose of improving wettability to a recording medium. Examples of the long-chain alkyl glycol ether include alkyl glycol ethers having an alkyl chain of 5 to 8 and preferably 6.

Specific examples of the long-chain alkyl glycol ether include ethylene glycol mono-n-pentyl ether, ethylene glycol monoisopentyl ether, ethylene glycol mononeopentyl ether, ethylene glycol mono-n-hexyl ether, ethylene glycol monoisohexyl ether, diethylene glycol mono-n-pentyl ether, diethylene glycol monoisopentyl ether, diethylene glycol mononeopentyl ether, diethylene glycol mono-n-hexyl ether, diethylene glycol monoisohexyl ether, triethylene glycol mono-n-pentyl ether, triethylene glycol monoisopentyl ether, triethylene glycol mononeopentyl ether, triethylene glycol mono-n-hexyl ether, triethylene glycol monoisohexyl ether, propylene glycol mono-n-pentyl ether, propylene glycol monoisopentyl ether, propylene glycol mononeopentyl ether, propylene glycol mono-n-hexyl ether, propylene glycol monoisohexyl ether, dipropylene glycol mono-n-pentyl ether, dipropylene glycol monoisopentyl ether, dipropylene glycol mononeopentyl ether, dipropylene glycol mono-n-hexyl ether, dipropylene glycol monoisohexyl ether, tripropylene glycol mono-n-pentyl ether, tripropylene glycol monoisopentyl ether, tripropylene glycol mononeopentyl ether, tripropylene glycol mono-n-hexyl ether, tripropylene glycol monoisohexyl ether, diethylene glycol mono-2-ethylhexyl ether, triethylene glycol mono-2-ethylhexyl ether, and tetraethylene glycol mono-2-ethylhexyl ether. These glycols may be added separately or in combination as a mixture of two or more.

In particular, ethylene glycol mono-n-hexyl ether, diethylene glycol mono-n-hexyl ether, triethylene glycol mono-n-hexyl ether, propylene glycol mono-n-butyl ether, dipropylene glycol mono-n-butyl ether, and tripropylene glycol mono-n-butyl ether are preferred from the viewpoints of achieving an excellent drying property after application and uniform wettability to a low-water-absorption recording medium. Among these, in particular, diethylene glycol mono-n-hexyl ether has the best balance among the drying property after application, uniform wettability, and water solubility.

The proportion of the long-chain alkyl glycol ether in the reaction liquid is preferably 10% by weight or less, more preferably 8% by weight or less, and still more preferably 4% by weight or less. When the proportion of the long-chain alkyl glycol ether in the reaction liquid exceeds 10% by weight, the long-chain alkyl glycol ether does not readily evaporate. This leads to a deterioration in drying property after the reaction liquid is applied to a recording medium. Furthermore, the long-chain alkyl glycol ether is not readily dissolved in the reaction liquid because of its low water solubility.

[Diacetylene Tetraol]

For the purpose of further improving wettability to a recording medium, the reaction liquid of the present invention may further contain a diacetylene tetraol represented by formula (2):

[Chem. 4]

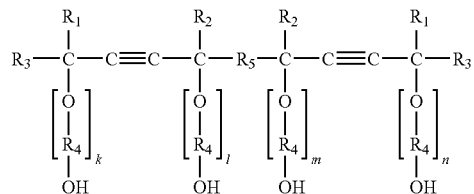

formula (2)

(wherein in formula (2), $R_1$'s and $R_2$'s each independently represent an alkyl group having 1 to 8 carbon atoms; $R_3$'s each independently represent a hydrogen atom or a methyl group; —O—$R_4$—'s each independently represent oxyethyl, oxypropyl, or oxybutyl; $R_5$ represents a divalent linking group; k, l, m, and n each represent an integer of 1 to 100).

As diacetylene tetraol represented by formula (2), for example, a commercially available product "Surfynol MD-20" (trade name, manufactured by Air Products and Chemicals Inc.) can also be used.

Diacetylene tetraol has the effect of significantly improving the wettability of the reaction liquid on a recording medium but is not readily dissolved in water, thus requiring a solubilizing aid when diacetylene tetraol is contained in the reaction liquid. As the solubilizing aid to diacetylene tetraol, the long-chain alkyl glycol ethers are effective. In particular, ethylene glycol mono-n-hexyl ether, diethylene glycol mono-n-hexyl ether, triethylene glycol mono-n-hexyl ether, propylene glycol mono-n-butyl ether, dipropylene glycol mono-n-butyl ether, and tripropylene glycol mono-n-butyl ether have a good balance among an effect as a solubilizing aid, uniform wettability to a low-water-absorption recording medium, and the drying property after application.

The diacetylene tetraol content of the reaction liquid is preferably in the range of 0.01% to 0.6% by weight and more preferably 0.05% to 0.3% by weight.

[1,2-Alkanediol]

The reaction liquid of the present invention may further contain 1,2-alkanediol for the purpose of improving the recoverability from clogging with the reaction liquid and the solubilizing aid such as the long-chain alkyl glycol ether.

As the 1,2-alkanediol, optionally branched 1,2-alkanediol having 5 or 6 carbon atoms is preferred. Examples thereof include 4-methyl-1,2-pentanediol, 1,2-pentanediol, 3,3-dimethyl-1,2-butanediol, and 1,2-hexanediol. Among these, 1,2-hexanediol is particularly preferred because 1,2-hexanediol is suitable as a solubilizing aid of the long-chain alkyl glycol ether in water and contributes to improvement in recoverability from clogging with the reaction liquid.

The 1,2-alkanediol content of the reaction liquid is preferably in the range of 1% to 10% by weight and more preferably 2% to 8% by weight. At a 1,2-alkanediol content exceeding 15% by weight, evaporation does not readily occur, so that the reaction liquid applied to a recording medium is not readily dried.

[Polyhydric Alcohol and Saccharide]

For the purpose of improving recoverability from clogging, the reaction liquid of the present invention may further contain a humectant to the extent that the drying property after application to a recording medium is not deteriorated. As the humectant, polyhydric alcohol and/or saccharide can be used. Specific examples of polyhydric alcohol include glycerol, ethylene glycol, diethylene glycol, triethylene glycol, trimethylolpropane, 1,5-pentanediol, 1,2,6-hexatriol. Examples of saccharide include monosaccharides, disaccharides, oligosaccharides (including trisaccharides and tetrasaccharides), and polysaccharides. Specific examples thereof include glucose, mannose, fructose, ribose, xylose, arabinose, galactose, aldonic acid, glucitol, (sorbitol), maltose, cellobiose, lactose, sucrose, trehalose, and maltotriose. Here, polysaccharides are used to indicate saccharides in a broad sense and include materials, such as alginic acid, α-cyclodextrin, and cellulose, which occur widely in nature. Examples of derivatives of these saccharides include reduced sugar from saccharides described above, for example, sugar alcohol (represented by general formula $HOCH_2(CHOH)_n CH_2OH$ (wherein n represents an integer of 2 to 5)), oxidized sugar (e.g., aldonic acid and uronic acid), amino acid, and thiosugar. Specific examples thereof include maltitol, sorbitol, and xylitol.

The humectant content of the reaction liquid is preferably in the range of 0.1% to 10% by weight and more preferably about 0.5% to about 6% by weight. Even in the case where a low-water-absorption recording medium is used, the drying property after application is not impaired as long as the humectant content is within the range above.

[Additional Component for Reaction Liquid]

The reaction liquid of the present invention contains water as a main solvent. As the water, pure water or ultrapure water, such as deionized water, ultrafiltered water, reverse osmotic water, or distilled water, is preferably used. Water sterilized by irradiating the foregoing water with ultraviolet rays or adding hydrogen peroxide the foregoing water is particularly preferred because the occurrence of molds and bacteria is prevented over long periods of time.

The reaction liquid of the present invention may further contain an organic amine, so that the pH of the reaction liquid can be readily adjusted to a suitable range. As the organic amine, a tertiary amine can be preferably used. Examples of the tertiary amine include alkanolamine, such as triethanolamine and tripropanolamine. The reaction liquid of the present invention preferably has a pH of 7 to 10 and particularly 7.5 to 9. It is possible to prevent the erosion of members constituting an inkjet apparatus as long as the pH is within the above range. In particular, a pH exceeding 12 can result in a significant deterioration in the storage stability of the reaction liquid.

The organic amine content of the reaction liquid is 0.01% by weight or more. From the viewpoints of achieving higher wettability of the reaction liquid on a recording surface of, for example, a recording medium used when a recording image is formed, the ejection stability of ink, storage stability, and high-speed printing, the organic amine content is preferably in the range of 0.05% to 5.0% by weight and more preferably 0.1% to 2.0% by weight.

The reaction liquid of the present invention may further contain a solubilizing aid, a preservative, a fungicide, an antioxidant, a conductivity modifier, a viscosity modifier, a surface-tension modifier, an oxygen absorber, and other agents.

Examples of the preservative and the fungicide include sodium benzoate, sodium pentachlorophenolate, sodium 2-pyridinethiol-1-oxide, sodium sorbate, sodium dehydroacetate, and 1,2-dibenzothiazolin-3-one (manufactured by ICI under the trade names of Proxel CRL, Proxel BND, Proxel GXL, Proxel XL-2, and Proxel Tenn.).

Examples of the solubilizing aid include alcohols, such as ethanol, propanol, and butanol; amines, such as diethanolamine and morpholine, and their derivatives; inorganic salts, such as potassium hydroxide, sodium hydroxide, and lithium hydroxide; ammonium hydroxide and quaternary ammonium hydroxide (e.g., tetramethylammonium); pyrrolidones, such as N-methyl-2-pyrrolidone and 2-pyrrolidone, and/or lactones γ-butyrolactone; ureas, such as urea-thiourea and tetramethylurea; allophanates, such as allophanate and methyl allophanate; and biurets, such as biurets-dimethylbiuret and tetramethylbiuret.

[Ink Composition]

The term "ink composition" used in the present invention is used to indicate a black ink composition when black-and-white printing is performed, and indicate each of color ink compositions, i.e., a yellow ink composition, a magenta ink composition, a cyan ink composition, and, as needed, a black ink composition, when color printing is performed.

The ink composition of the present invention contains at least water, a colorant, and a resin emulsion.

As water contained in the ink composition of the present invention, water described in the reaction liquid section above can be used.

As the colorant contained in the ink composition of the present invention, any dye or pigment may be used. In the case of suppressing the penetration of the colorant contained in ink by insolubilizing the ink composition or increasing the viscosity of the ink composition, a pigment dispersed in an aqueous medium has advantages over dye dissolved in an aqueous medium. The pigment is also preferred from the viewpoints of light fastness and water resistance.

Example of dye that can be used include various dyes commonly used for inkjet recording, e.g., direct dyes, acid dyes, food colorants, basic dyes, reactive dyes, disperse dyes, vat dyes, soluble vat dyes, and reactive disperse dyes.

Examples of the pigment that can be used include carbon blacks (C.I. Pigment Black 7), such as furnace black, lamp black, acetylene black, and channel black; iron oxide; and titanium oxide. Examples of an organic pigment that can be used include azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acidic dye chelates); dye lakes (basic dye lakes and acidic dye lakes); nitro pigments; nitroso pigments; aniline black; and daylight fluorescent pigments. These pigments may be used separately or in combination of two or more.

As a pigment used for the black ink composition, carbon black is preferred. Specific examples of carbon black include #2300, #900, HCF88, #33, #40, #45, #52, MA7, MA8, MA100, and #2200B manufactured by Mitsubishi Chemical Corporation; Raven 5750, Raven 5250, Raven 5000, Raven 3500, Raven 1255, and Raven 700 manufactured by Columbia Chemicals Company; Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Corporation; Color Black FW1, Color Black FW2V, Color Black FW18, Color Black FW200, Color Black S150, Color Black S160, Color Black S170, Printex 35, Printex U, Printex V, Printex 140U, Specisal Black 6, Specisal Black 5, Specisal Black 4A, and Specisal Black 4 manufactured by Degussa AG. These may be used separately or in combination as a mixture of two of them.

A set of the color ink compositions includes at least a yellow ink composition, a magenta ink composition, and a cyan ink composition. Examples of pigments for use in the color ink compositions include pigment yellows, pigment reds, pigment violets, and pigment blues described in Color Index.

Specific examples thereof include C.I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 128, 138, 147, 150, 153, 155, 174, 180, 188, and 198; C.I. Pigment Reds 1, 3, 5, 8, 9, 16, 17, 19, 22, 38, 57:1, 90, 112, 122, 123, 127, 146, 184, 202, 207, 209; C.I. Pigment Violets 1, 3, 5:1, 16, 19, 23, and 38; C.I. Pigment Blues 1, 2, 15, 15:1, 15:2, 15:3, 15:4, 16; and C.I. Pigment Blacks 1 and 7. A plurality of the pigments may be used to form an ink composition.

In particular, the organic pigment in the yellow composition preferably contains at least one selected from C.I. Pigment Yellows 74, 109, 116, 128, 138, 147, 150, 155, 180, and 188. The organic pigment in the magenta ink composition preferably contains at least one selected from C.I. Pigment Reds 122, 202, 207, and 209, and C.I. Pigment Violet 19. The organic pigment in the cyan ink composition preferably contains at least one selected from C.I. Pigment Blues 15, 15:11, 15:2, 15:3, 15:4, and 16.

Furthermore, any pigment that is not described in Color Index can be used as long as it is insoluble in water.

According to a preferred embodiment of the present invention, each of the pigments is preferably added to ink in the form of a pigment dispersion containing a corresponding one of the pigments in an aqueous medium with a dispersant or surfactant. A dispersant, such as a polymeric dispersant, commonly used to prepare a pigment dispersion can be preferably used.

Preferred examples of the dispersant or surfactant include polyacrylic acid, polymethacrylic acid, acrylic acid-acrylonitrile copolymers, vinyl acetate-acrylate copolymers, acrylic acid-alkyl acrylate copolymers, styrene-acrylic acid copolymers, styrene-methacrylic acid copolymers, styrene-acrylic acid-alkyl acrylate copolymers, styrene-methacrylic acid-alkyl acrylate copolymers, styrene-α-methylstyrene-acrylic acid copolymers, styrene-α-methylstyrene-acrylic acid-alkyl acrylate copolymers, styrene-maleic acid copolymers, vinyl-naphthalene-maleic acid copolymers, vinyl acetate-ethylene copolymers, vinyl acetate-fatty acid vinylethylene copolymers, vinyl acetate-maleate copolymers, vinyl acetate-crotonic acid copolymers, and vinyl acetate-acrylic acid copolymers.

According to a preferred embodiment of the present invention, each of the copolymers preferably has a weight-average molecular weight of about 3,000 to about 50,000, more preferably about 5,000 to about 30,000, and most preferably about 7,000 to about 15,000.

The amount of the dispersant added is appropriately determined to the extent that the dispersant allows the pigment to disperse stably and that other advantages of the present invention are not impaired. According to a preferred embodiment of the present invention, with respect to the amount added, pigment:dispersant is preferably in the range of about 1:0.06 to about 1:3 and more preferably about 1:0.125 to about 1:3.

The amount of the pigment added to ink is preferably in the range of about 0.5% to about 25% by weight and more preferably about 2% to about 15% by weight.

The ink composition of the present invention is characterized by containing a resin emulsion. The term "resin emulsion" is used to indicate an emulsion in which a continuous phase is water and a disperse phase is composed of a resin component described below. Examples of a resin component constituting the disperse phase include acrylic resins, vinyl acetate resins, styrene-butadiene resins, vinyl chloride resins, acrylic-styrene resins, butadiene resins, styrene resins, cross-linked acrylic resins, cross-linked styrene resins, benzoguanaminae resins, phenolic resins, silicone resins, and epoxy resins.

According to a preferred embodiment of the present invention, the resin is preferably composed of a polymer having a hydrophilic portion and a hydrophobic portion. The particle size of the resin component is not particularly limited as long as the resin component forms an emulsion. The particle size is preferably about 150 nm or less and more preferably about 5 to about 100 nm.

The resin emulsion can be prepared by dispersion polymerization of a resin monomer in water together with a surfactant as needed. For example, an emulsion of an acrylic resin or a styrene-acrylic resin can be prepared by dispersion polymerization of (meth)acrylate or (meth)acrylate and styrene in water with a surfactant. Usually, the mixing ratio of the resin component to the surfactant is preferably in the range of about 10:1 to about 5:1. When the amount of the surfactant used is in the above range, ink has more satisfactory resistance to water and permeability. Preferred examples of the surfactant include, but are not particularly limited to, anionic surfactants (e.g., sodium dodecylbenzenesulfonate, sodium laurate, and ammonium polyoxyethylene alkyl ether sulfate); and nonionic surfactants (e.g., polyoxyethylene alkyl ether, polyoxyethylene alkyl ester, polyoxyethylene sorbitan fatty acid ester, polyoxyethylene alkylphenyl ether, polyoxyethylene alkylamine, and polyoxyethylene alkylamide). These may be used separately or in combination as a mixture of two or more. Furthermore, acetylene glycol (Olefin Y and Surfynol 82, 104, 440, 465, and 485 (trade name, manufactured by Air Products and Chemicals Inc.) can also be used.

With respect to the proportions of water and the resin constituting the disperse phase, the proportion of water is suitably in the range of 60 parts by weight to 400 parts by weight and preferably 100 to 200 relative to 100 parts by weight of the resin.

A commercially available resin emulsion can also be used. Examples thereof include Microgel E-1002 and E-5002 (styrene-acrylic resin emulsion, manufactured by Nippon Paint Co., Ltd.), Boncoat 4001 (acrylic resin emulsion, manufactured by Dainippon Ink & Chemicals, Inc.), Boncoat 5454 (styrene-acrylic resin emulsion, manufactured by Dainippon Ink & Chemicals, Inc.), SAE-(styrene-acrylic resin emulsion, manufactured by Nippon Zeon Co., Ltd.), and Saibinol SK-200 (acrylic resin emulsion, manufactured by Saiden Chemical Industry Co., Ltd).

Ink used in the present invention preferably contains the resin emulsion so as to have a resin component content of 0.1% to 40% by weight and more preferably 1% to 25% by weight with respect to the weight of ink.

The resin emulsion has the effects of suppressing the penetration of a coloring component and facilitating the fixation on a recording medium because of the interaction with polyvalent metal ions. Some resin emulsions have the additional effect of forming films on the recording medium to improve the abrasion resistance of a printed matter.

According to a preferred embodiment of the present invention, the ink composition may contain a thermoplastic resin in the form of a resin emulsion. The term "thermoplastic resin" is used to indicate a resin having a softening temperature of 50° C. to 250° C. and preferably 60° C. to 200° C. The term "softening temperature" is used to indicate the minimum temperature among the glass transition temperature, the melting point, a temperature at which the viscosity reaches 10 poises to 10 poises, and the pour point of the thermoplastic resin and the minimum filming temperature (MFT) for a resin emulsion. In the case of using the ink composition containing the resin emulsion, a heating step of heating a recording medium after recording at a temperature equal to or higher than the softening temperature of the thermoplastic resin is preferably performed.

As the resin, it is preferable to select a resin that forms a film having high resistance to water and abrasion when the resin is heated to its softening or melting temperature or higher and then cooled.

Specific examples of a water-insoluble thermoplastic resin include, but are not limited to, polyacrylic acid, polymethacrylic acid, polymethacrylate, polyethylacrylic acid, styrene-butadiene copolymers, polybutadiene, acrylonitrile-butadiene copolymers, chloroprene copolymers, fluorocarbon resins, vinylidene fluoride, polyolefin resins, cellulose, styrene-acrylic acid copolymers, styrene-methacrylic acid copolymers, polystyrene, styrene-acrylamide copolymers, polyisobuatyl acrylate, polyacrylonitrile, polyvinyl acetate, polyvinyl acetal, polyamide, rosin resins, polyethylene, polycarbonate, vinylidene chloride resins, cellulose resins, vinyl acetate resins, ethylene-vinyl acetate copolymers, vinyl acetate-acrylic copolymers, vinyl chloride resins, polyurethane, and rosin esters.

Specific examples of a low-molecular-weight thermoplastic resin include animal and plant waxes, such as polyethylene wax, montan wax, alcohol wax, oxidized synthetic wax, αolefin-maleic anhydride copolymers, and carnauba wax, lanolin, paraffin wax, and microcrystalline wax.

As the resin emulsion, a known resin emulsion can be used. Resin emulsions described in, for example, Japanese Examined Patent Application Publication No. 62-1426, Japanese Unexamined Patent Application Publication Nos. 3-56573, 3-79678, 3-160068, and 4-18462 can be used without any processing.

According to a preferred embodiment of the present invention, the ink composition may contain an alginic acid derivative. Preferred examples of the alginic acid derivative include alkali metal salts of alginic acid (e.g., a sodium salt and a potassium salt), organic salts of alginic acid (e.g., a triethanolamine salt), and ammonium alginate.

The amount of the alginic acid derivative added to the ink composition is preferably in the range of about 0.01% to 1% by weight and more preferably about 0.05% to about 0.5% by weight.

The reason for the addition of the alginic acid derivative results in a satisfactory image is not clear but seems to be attributed to the fact that a polyvalent metal salt present in the reaction liquid reacts with the alginic acid derivative in the ink composition to change the dispersion state of the colorant and facilitate the fixation of the colorant onto a recording medium.

The ink composition used in the present invention may contain an inorganic oxide colloid. Preferred examples of the inorganic oxide colloid include colloidal silica and colloidal alumina. In general, the inorganic oxide colloid is a colloidal solution of ultrafine particles composed of, for example, $SiO_2$ or $Al_2O_3$ dispersed in water or an organic solvent. With respect to a commercially available inorganic oxide colloid, in general, a dispersion medium is composed of water, methanol, 2-propanol, n-propanol, or xylene, and $SiO_2$ or $Al_2O_3$ has a particle size of 5 nm to 100 nm. In many cases, the colloidal solution of the inorganic oxide is not adjusted to be neutral but acidic or basic. This is because the stable region of the dispersion of the inorganic oxide colloid is present on the acidic side or basic side. Thus, In the case of adding the inorganic oxide colloid to the ink composition, the addition needs to be performed in consideration of the pH of the stable region of the dispersion of the inorganic oxide colloid and the pH of ink.

The amount of the inorganic oxide colloid added to the ink composition is preferably in the range of 0.1% to 15% by weight. Two or more types of inorganic oxide colloids can be added.

According to a preferred embodiment of the present invention, the ink composition preferably contains an organic solvent. The organic solvent is preferably a low-boiling-point organic solvent. Preferred examples thereof include methanol, ethanol, n-propyl alcohol, iso-propyl alcohol, n-butanol, sec-butanol, tert-butanol, iso-butanol, and n-pentanol. In particular, monohydric alcohol is preferred. The low-boiling-point organic solvent has the effect of reducing the drying time of ink.

According to a preferred embodiment of the present invention, preferably, the ink composition used in the present invention further contains a humectant composed of a high-boiling-point organic solvent. Preferred examples of the high-boiling-point organic solvent include polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, and trimethylolpropane; alkyl ethers of polyhydric alcohols, such as ethylene glycol monoethyl ether, ethylene glycol mono butyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

The amount of the humectant added is preferably in the range of 0.5% to 40% by weight and more preferably 2% to 20% by weight with respect to the weight of ink. The amount of the low-boiling-point organic solvent added is preferably in the range of 0.5% to 10% by weight and more preferably 1.5% to 6% by weight with respect to the weight of ink.

According to a preferred embodiment of the present invention, the ink composition preferably contains saccharide. Examples of saccharide include monosaccharides, disaccharides, oligosaccharides (including trisaccharides and tetrasaccharides), and polysaccharides. Preferred examples thereof include glucose, mannose, fructose, ribose, xylose, arabinose, galactose, aldonic acid, glucitol, (sorbitol), maltose, cellobiose, lactose, sucrose, trehalose, and maltotriose. Here, polysaccharides refer to saccharides in a broad sense and include materials, such as alginic acid, α-cyclodextrin, and cellulose, which occur widely in nature.

Examples of derivatives of these saccharides include reduced sugar from saccharides described above, for example, sugar alcohol (represented by general formula $HOCH_2(CHOH)_nCH_2OH$ (wherein n represents an integer of 2 to 5)), oxidized sugar (e.g., aldonic acid and uronic acid), amino acid, and thiosugar. In particular, sugar alcohol is preferred. Specific examples thereof include maltitol and sorbitol.

The saccharide content is suitably in the range of 0.1% to 40% by weight and preferably 0.5% to 30% by weight with respect to the weight of ink.

Additional agents, such as a pH modifier, a preservative, and a fungicide, may be added, as needed.

[Recording Method]
[Inkjet Recording Method]

In this embodiment, "inkjet recording method" means a method in which droplets of a reaction liquid and an ink composition are ejected from minute nozzles with an inkjet recording apparatus and then the droplets are attached to a recording medium. The method will be specifically described below.

A first inkjet recording method is an electrostatic suction method in which recording is performed by applying a strong electric field between nozzles and an acceleration electrode placed in front of the nozzles to continuously spray ink in the form of droplets from the nozzles, and providing a print information signal to deflection electrodes during the time the ink droplets are flying between the deflection electrodes, or by discharging ink droplets according to a print information signal without deflecting the ink droplets.

A second method is a type in which ink droplets are forcibly discharged by applying pressure to an ink liquid with a small pump and mechanically vibrating nozzles with a crystal oscillator. The sprayed ink droplets are charged simultaneous to being sprayed, and a print information signal is imparted to deflection electrodes during the time the ink droplets are flying between the deflection electrodes.

A third method is a type that uses piezoelectric devices in which ink droplets are sprayed to carry out recording by applying pressure to an ink liquid with piezoelectric devices while simultaneously imparting a print information signal to the ink liquid.

A fourth method is a type in which the volume of ink droplets is made to expand rapidly by the action of thermal energy, causing ink droplets to be sprayed to carry out recording by foaming the ink droplets by heating with a microelectrode in accordance with a print information signal.

Any of these methods can be used as an inkjet recording method using the ink composition of the present invention.

[Inkjet Recording Method in which Two Liquids are Printed]

An inkjet recording method according to the present invention includes the step of printing a reaction liquid and an ink composition by any of the inkjet recording methods described above.

The reaction solution and the ink composition may be applied on a recording medium in any sequence. Specifically, any of the following methods may be suitably used: a method in which a reaction solution is first deposited onto a recording medium followed by deposition of an ink composition onto the recording medium with the reaction solution deposited thereon; a method in which an ink composition is first printed followed by deposition of the reaction solution; and a method in which a reaction solution and an ink composition are mixed together immediately before or immediately after ejection thereof.

According to a preferred embodiment of the present invention, the method in which a reaction solution is first deposited onto a recording medium followed by deposition of an ink composition onto the recording medium is more preferred from the viewpoint of suppressing feathering, color bleeding, and uneven printing.

According to the inkjet recording method of the present invention, good printing can be realized by bringing the reaction solution into contact with the ink composition. Although the present invention is not intended to be bound by the theory, the reason why good printing can be achieved by the present invention is believed as follows. Upon contact of the reaction solution with the ink composition, the polyvalent metal ions, polyallylamine, and a polyallylamine derivative contained in the reaction liquid break the state of dispersion of a colorant, a resin emulsion, and the like contained in the ink composition, resulting in agglomeration of a coloring component, the resin emulsion, and the like. The resultant agglomerates are considered to inhibit the penetration of the colorant into the recording medium. It is considered that this results in the formation of images having high color density and free from feathering and uneven printing. Furthermore, in color images, uneven color mixing in boundaries of different colors, that is, color bleeding, can also be advantageously prevented. It is considered that the resin emulsion remaining on the recording medium is attached on the recording medium, and then particles are bonded to form a film, accelerating the fixation of the colorant on the recording medium. This seems to result in a recording product with excellent abrasion resistance. However, it should be noted that the above mechanism is merely hypothetical, and the present invention should not be construed to be limited by this mechanism.

The deposition of the reaction solution onto the recording medium may be carried out by any of a method in which the reaction solution is selectively deposited onto only an area where the ink composition is deposited, and a method in which the reaction solution is deposited on the whole area of the paper. The former method is cost-effective because the consumption of the reaction solution can be minimized. In this method, however, the accuracy of the position at which both the reaction solution and the ink composition are deposited should be high to some extent. On the other hand, in the latter method, as compared with the former method, the requirement for the accuracy of the position where the reaction solution and the ink composition are deposited is not strict. In the latter method, however, a large amount of the reaction solution should be deposited on the whole area of the paper. This is likely to create curling of the paper at the time of drying. For this reason, the method used may be determined by taking a combination of the ink composition with the reaction solution into consideration. In the former method, the reaction solution can be deposited by inkjet recording.

The time interval between the application of the reaction liquid and the application of the ink composition is preferably set to 1 sec or less from the viewpoints of achieving good print quality and abrasion resistance. In the case where the ink composition is printed after more than 1 sec of deposition of the reaction liquid, the reaction liquid may penetrate into the recording medium to inhibit the agglomeration reaction on a surface of paper, thus reducing the effect of suppressing feathering, color bleeding, and uneven printing and reducing abrasion resistance and color developability.

According to a preferred embodiment of the present invention, the reaction liquid and the ink composition are preferably printed on a recording medium in a single pass. It should be obvious to those skilled in the art that the single-pass printing enables high-speed printing, thereby increasing the productivity of a recording product. As described above, the agglomeration reaction of the reaction liquid and the ink composition occurs assuredly on the recording product before the penetration of the reaction liquid into the recording medium, thereby improving the effect of suppressing feathering, color bleeding, uneven printing, and improving abrasion resistance and color developability. The reaction liquid used in the present invention has excellent wettability on a recording medium, so that the object can be achieved by the use of only a small amount of the reaction liquid.

According to a preferred embodiment of the present invention, it is preferable to perform heating a recording medium to which the reaction liquid and/or the ink composition has been attached. Specific examples thereof include a step of heating a recording medium to which the reaction liquid has been attached and then applying the ink composition; a step of heating a recording medium to which the ink composition has been applied and then applying the reaction liquid; and a step of heating a recording medium to which the reaction liquid and the ink composition have been applied. The heat treatment facilitates the evaporation of water in the reaction liquid and the ink composition, preventing the occurrence of cockles in the recording medium and effectively inhibiting the occurrence of curling in the recording medium. Furthermore, heating facilitates the fusion of the resin emulsion in the ink composition, so that an excellent film can be formed, thereby further improving the abrasion resistance of a recording product. The heating temperature is preferably in the range of about 40° C. to about 150° C. and more preferably about 4° C. to about 100° C.

According to a preferred embodiment of the present invention, the reaction liquid preferably has a surface tension of 20 mN/m to 35 mN/m, and the ink composition preferably has a surface tension of 25 mN/m to 50 mN/m. According to this inkjet recording method, a satisfactory image is produced. Specifically, a printed image having only a low feathering level, uniform printing, a high OD value, and excellent abrasion resistance is formed. Furthermore, the inkjet recording method preferably contributes to a reduction in the size of a recording head and an increase in print speed. In addition, the surface tension of the reaction liquid is preferably lower than that of the ink composition. In this case, high-quality printing is more stably performed regardless of the sequence of the attachment of the reaction liquid and the ink composition.

Each of the reaction liquid and the ink composition preferably has a viscosity of 1.5 mPa·s to 15 mPa·s and more preferably 1.5 mPa·s to 10 mPa·s at 20° C. Furthermore, the reaction liquid and the ink composition preferably have substantially the same viscosity. For example, the viscosity of one is set to 50% to 200% of the viscosity of the other. This is advantageous in that when both of the reaction liquid and the ink composition are ejected from an inkjet recording head, the same recording head, passage structure, and driving circuit can be used.

[Inkjet Recording Apparatus]

An inkjet recording apparatus with which the inkjet recording method of the present invention is performed will be described below with reference to the attached drawings.

An inkjet recording apparatus according to an embodiment shown in FIG. 1 is configured to accommodate an ink composition and a reaction liquid in a tank and feed the ink composition and the reaction liquid into a recording head through an ink tube. That is, a recording head 1 communicates with an ink tank 2 through an ink tube 3. The inside of the ink tank 2 is partitioned and includes a compartment for the ink composition, in some cases, compartments for a plurality of color inks, and a compartment for the reaction liquid.

The recording head 1 is transferred by a timing belt 6, along a carriage 4, driven by a motor 5. A recording medium 7 such as paper is placed at a position facing the recording head 1 with a platen 8 and a guide 9. In this embodiment, a cap 10 is arranged. The cap 10 is connected to a suction pump 11 and in order to conduct a "cleaning operation". The ink composition sucked is stocked in a waste ink tank 13 through a tube 12.

Figure 2:
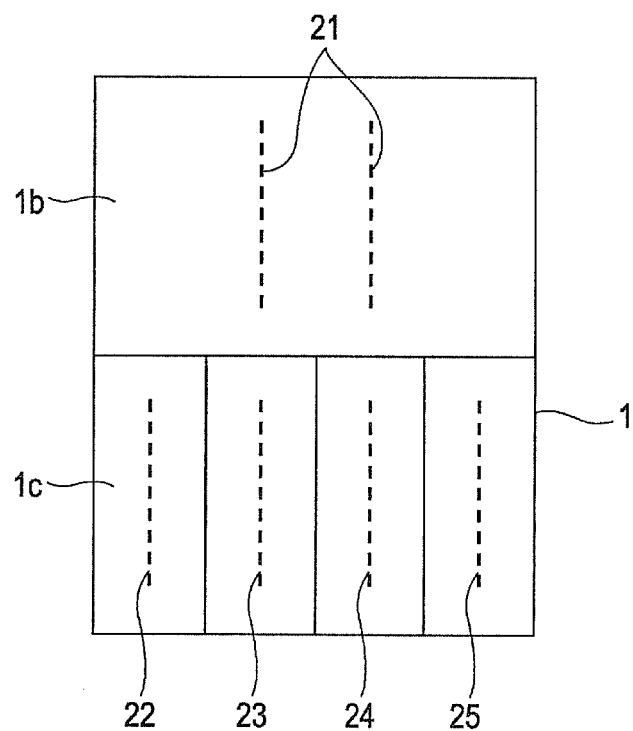
FIG. 2 is an enlarged view of a nozzle face of a recording head.

FIG. 2 is an enlarged view showing the surface of nozzles of the recording head 1. A nozzle surface 1b for a reaction liquid is indicated by reference numeral 1b in the figure. First liquid ejection nozzles 21 configured to eject a reaction liquid are arranged in the longitudinal direction. A nozzle surface 1c for ink compositions is indicated by 1c in the figure. A yellow ink composition, a magenta ink composition, a cyan ink composition, and a black ink composition are ejected through ink composition ejection nozzles 22, 23, 24, and 25, respectively.

Figure 3:
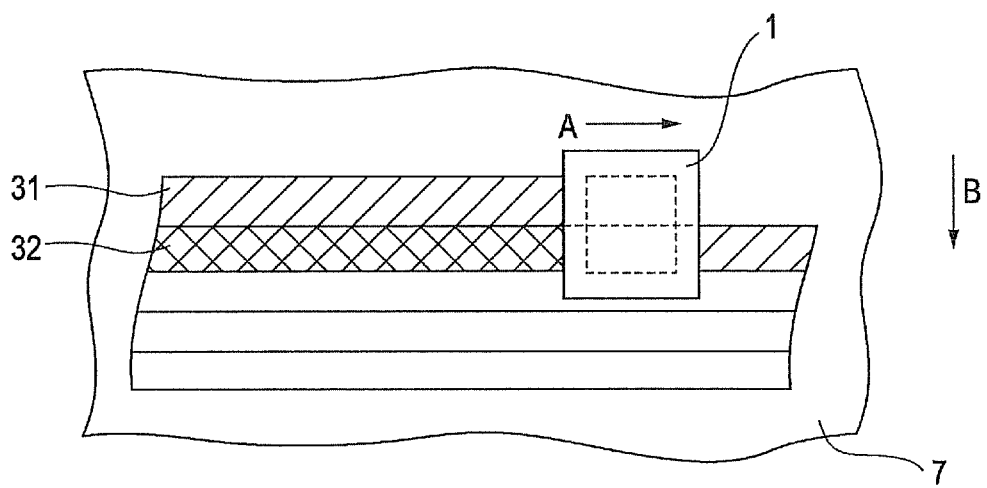
FIG. 3 illustrates inkjet recording with the recording head shown in FIG. 2.

An inkjet recording method using the recording head shown in FIG. 2 will be described below with reference to FIG. 3. The recording head 1 moves in the direction indicated by an arrow A, during which time the reaction solution is ejected through the nozzle surface 1b to form a first liquid-deposited region 31 in a strip form on the recording medium 7. Subsequently, the recording medium 7 is transported by a predetermined extent in the paper feed direction indicated by an arrow B, during which time the recording head 1 is moved in the direction opposite to that indicated by the arrow A in the drawing and returned to the left end of the recording medium 7. The recording head 1 conducts printing using the ink composition on the first liquid-deposited region 31, thereby forming a print region 32.

Figure 4:
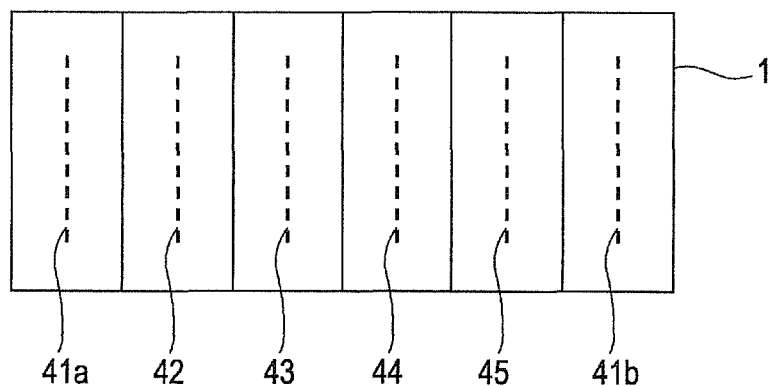
FIG. 4 shows a recording head according to another embodiment.

Alternatively, as shown in FIG. 4, in the recording head 1, it is also possible to arrange all nozzles in the lateral direction. This structure is suitable for single-pass printing. In the figure, reference numerals 41a and 41b denote ejection nozzles for a reaction liquid. A yellow ink composition, a magenta ink composition, a cyan ink composition, and a black ink composition are ejected through nozzles 42, 43, 44 and 45, respectively. In the recording head according to this embodiment, the recording head 1, when reciprocated on the carriage, can conduct printing in both directions. Thus, in this case, printing at a higher speed can be performed as compared with the case where the recording head shown in FIG. 2.

Regulating the surface tension of the reaction solution and the ink composition results in more stable high-quality printing regardless of the order of depositing the reaction solution and the ink composition. In this case, only one ejection nozzle for the reaction liquid may be used (for example, the nozzle indicated by numeral 41b in the figure may be omitted), leading to a further reduction in the size of the head and an increase in printing speed.

In the ink jet recording apparatus, the supplement of the ink composition may be carried out by replacing a cartridge as an ink tank. The ink tank may be integral with the recording head.

Figure 5:
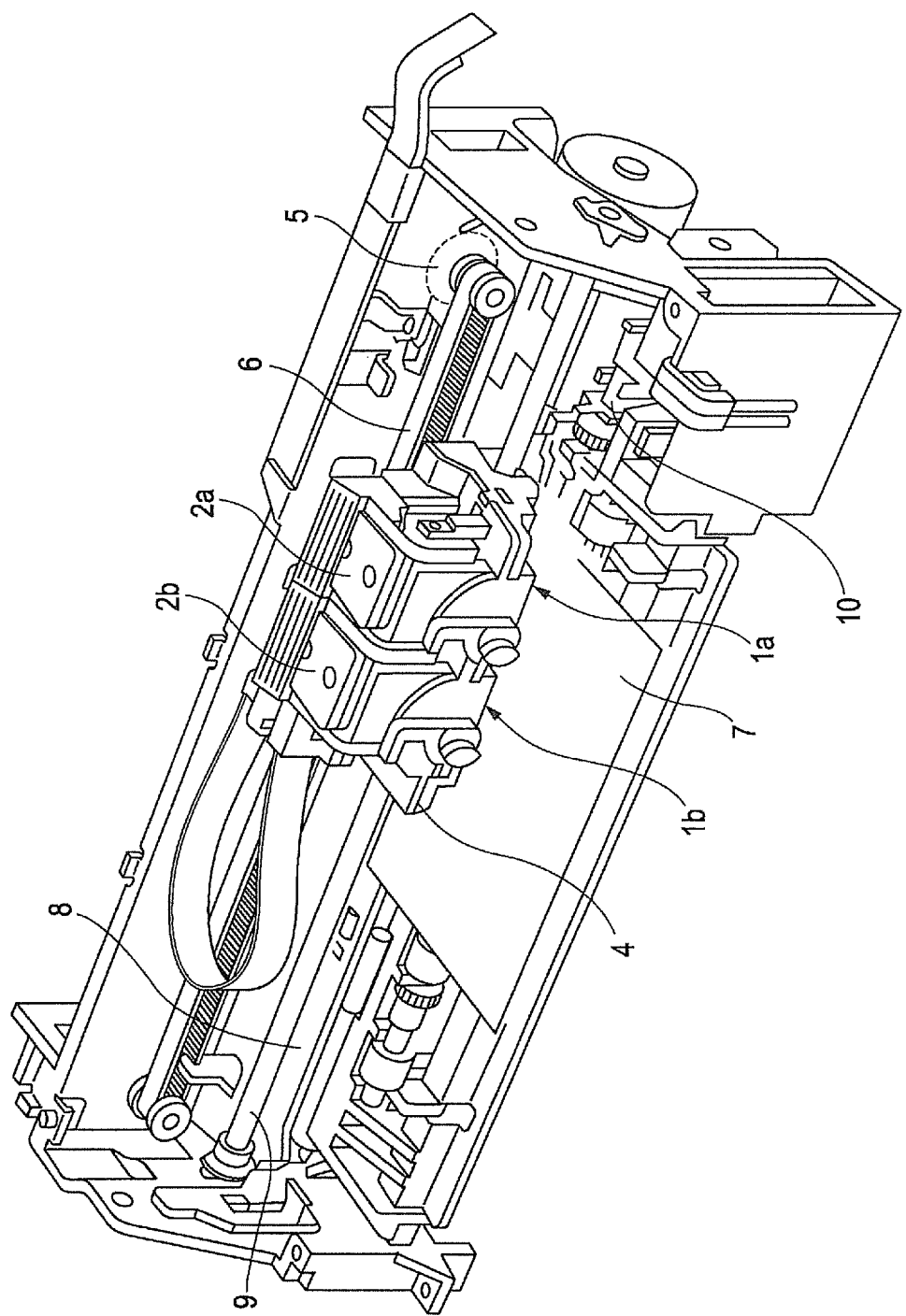
FIG. 5 shows an inkjet recording apparatus with which a method according to the present invention is performed.

FIG. 5 shows an ink jet recording apparatus using such an ink tank according to a preferred embodiment. In the drawing, the same members as used in the apparatus shown in FIG. 1 have the same reference numerals. In the embodiment shown in FIG. 5, recording heads 1a and 1b are integral with ink tanks 2a and 2b, respectively. An ink composition and a reaction liquid are ejected with the recording heads 1a and 1b, respectively. Basically, printing may be conducted in the same way as described above with the apparatus shown in FIG. 1. In this embodiment, the recording head 1a is moved together with the ink tank 2a on the carriage 4, while the recording head 1b is moved together with the ink tank 2b on a carriage 4.

Figure 6:
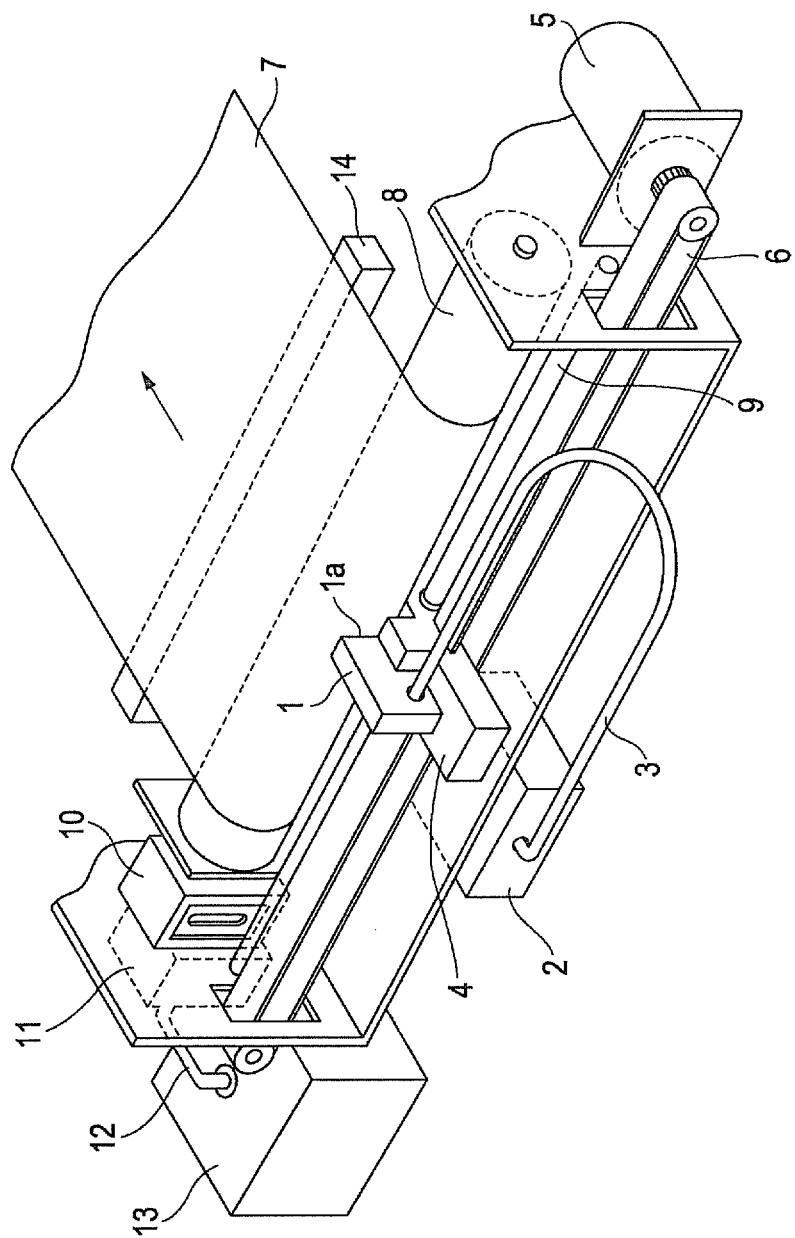
FIG. 6 shows an inkjet recording apparatus with which a method according to the present invention is performed.

FIG. 6 shows an inkjet recording apparatus, according to a preferred embodiment, including a heater configured to heat a recording medium that has been printed. The inkjet recording apparatus shown in FIG. 6 is the same as that shown in FIG. 1, except that a heater 14 is arranged. The heater 14 may be a heater that heats a recording medium while being contact with the recording medium. Alternatively, the heater 14 may be a heater that heats the recording medium without coming into contact with the recording medium, for example, by irradiating the recording medium with infrared rays or by blowing hot air.

According to a preferred embodiment of the present invention, preferably, the inkjet recording apparatus is preferably such that it can accommodate an ink composition and a reaction liquid and, regarding the amounts of the ink composition and the reaction solution, the ink composition is used up earlier than the reaction liquid.

Furthermore, according to a preferred embodiment of the present invention, an ink tank for use in the inkjet recording apparatus is provided. The ink tank may be of either a replaceable cartridge type or a type where it is integral with the recording head. In any case, the ink tank is preferably such that it can accommodate the reaction solution and the ink composition and, regarding the amounts of the ink composition and the reaction solution, the ink composition is used up earlier than the reaction solution.

In contrast, it should be noted that when the reaction liquid is used up earlier than the ink composition, it is difficult to learn when the reaction solution has been used up because the reaction solution is usually transparent. That is, in this case, the fact that the reaction liquid has been used up cannot be learned until the user observes the print and notices a deterioration in print quality, making it necessary for the user to always observe the print quality.

In the ink jet recording apparatus according to the above embodiment, since the ink composition per se is usually in a colored state, it is possible to learn when the ink composition has been used up. Furthermore, since there is no possibility that the reaction liquid is used up earlier than the ink composition, inkjet recording in which two liquids are printed can be stably performed. The arrangement of sensor means or the like on the tank section configured to accommodate the ink composition and the reaction liquid is considered to be effective in observing the consumption of the liquids. In this case, however, the mechanism is complicated. In this sense, the above embodiment is advantageous because the use of a simple mechanism suffices for the contemplated purposes.

In the above embodiment, in the case where a plurality of ink compositions are used, the expression "the ink composition is used up earlier than the reaction liquid" does not necessarily indicate that part of the reaction liquid should remain in the tank when all the plurality of ink compositions have been used up as long as part of the reaction liquid remains in the tank when any one of the ink compositions has been used up. Preferably, however, part of the reaction solution remains in the tank when all the plurality of ink compositions have been used up.

[Recording Product]

A recording product according to the embodiment is such that recording is performed on a recording medium by at least the foregoing inkjet recording method. The employment of the foregoing inkjet recording method results in the recording product with excellent quality, i.e., the recording product which is free from feathering, color bleeding, and uneven printing and which has excellent abrasion resistance.

EXAMPLES

While the present invention will be described below in more detail by means of the following examples, the present invention is not limited these examples.

Evaluations 1 to 8 of reaction liquids (1 to 12) shown in Table 1 were made.

Printing was conducted on "OK Topcoat N", a type of coated paper, (manufactured by Oji paper Co., Ltd.) serving as a recording medium with an inkjet printer PX-G930 (manufactured by Seiko Epson Corporation) at a resolution of 360 dpi to form a recording product to be evaluated. The amount of water absorbed within 20 $\mathrm{msec}^{1/2}$ from the start of contact in the Bristow method was 6 $\mathrm{mL/m}^2$. Components described in Table 2 were used to prepare black and cyan ink compositions.

TABLE 1

| | Component | Example 1 Reaction liquid 1 | Example 2 Reaction liquid 2 | Example 3 Reaction liquid 3 | Example 4 Reaction liquid 4 | Example 5 Reaction liquid 5 | Example 6 Reaction liquid 6 | Example 7 Reaction liquid 7 |
|---|---|---|---|---|---|---|---|---|
| Polyvalent metal salt | Magnesium nitrate hexahydrate | 25.0 | — | — | — | — | 25.0 | — |
| | Magnesium sulfate heptahydrate | — | 25.0 | — | — | — | — | 25.0 |
| | Calcium acetate monohydrate | — | — | 10.0 | — | — | — | — |
| Polyamine | PAS-A-1 (solid content: 24%) | — | — | — | 5.0 | — | — | — |
| | PAA-HCL-05 (solid content: 40%) | — | — | — | — | 10.0 | — | — |
| Polyether-modified polysiloxane-based compound | BYK-347 | 0.5 | — | 0.5 | — | 0.5 | — | 0.5 |
| | BYK-348 | — | 0.5 | — | 0.5 | — | 0.5 | — |
| Long-chain alkyl glycol ether | Diethylene glycol mono-n-hexyl ether | 3.0 | 3.0 | 3.0 | 3.0 | 3.0 | 2.0 | 3.0 |
| | Tripropylene glycol mono-n-butyl ether | — | — | — | — | — | 1.0 | — |
| Diacetylene tetraol | Surfynol MD20 | — | — | — | — | — | 0.1 | — |
| 1,2-Alkanediol | 1,2-Hexanediol | 10.0 | 10.0 | — | 10.0 | — | 10.0 | 15.0 |
| | 4-Methyl-1,2-pentanediol | — | — | 10.0 | — | 10.0 | — | — |
| Polyhydric alcohol | Glycerol | — | 5.0 | 5.0 | — | — | 5.0 | — |
| | Diethylene glycol | 5.0 | — | — | 5.0 | — | — | — |
| | Glucose | — | — | — | — | 3.0 | — | — |
| Others | N-Methyl-2-pyrrolidone | 10.0 | 10.0 | 10.0 | — | — | 10.0 | 10.0 |
| | 2-Pyrrolidone | — | — | — | 10.0 | 10.0 | — | — |
| | Triethanolamine | 0.5 | 0.5 | 0.5 | 0.5 | 0.5 | 0.5 | 0.5 |
| | Triethylene glycol monoethyl ether | — | — | — | — | — | — | — |
| | Surfynol 466 | — | — | — | — | — | — | — |
| | Ultrapure water | Balance | Balance | Balance | Balance | Balance | Balance | Balance |

TABLE 1-continued

| | Component | Example 8 Reaction liquid 8 | Example 9 Reaction liquid 9 | Comparative Example 1 Reaction liquid 10 | Comparative Example 2 Reaction liquid 11 | Comparative Example 3 Reaction liquid 12 |
|---|---|---|---|---|---|---|
| Polyvalent metal salt | Magnesium nitrate hexahydrate | — | 25.0 | — | 25.0 | — |
| | Magnesium sulfate heptahydrate | 25.0 | — | 5.0 | — | — |
| | Calcium acetate monohydrate | — | — | — | — | — |
| Polyamine | PAS-A-1 (solid content: 24%) | — | — | — | — | — |
| | PAA-HCL-05 (solid content: 40%) | — | — | — | — | — |
| Polyether-modified polysiloxane-based compound | BYK-347 | — | — | — | — | 0.5 |
| | BYK-348 | 0.5 | 0.5 | — | — | — |
| Long-chain alkyl glycol ether | Diethylene glycol mono-n-hexyl ether | — | 2.0 | — | — | — |
| | Tripropylene glycol mono-n-butyl ether | — | 1.0 | — | — | — |
| Diacetylene tetraol | Surfynol MD20 | — | — | — | — | — |
| 1,2-Alkanediol | 1,2-Hexanediol | — | 10.0 | — | — | 10.0 |
| | 4-Methyl-1,2-pentanediol | 10.0 | — | — | — | — |
| Polyhydric alcohol | Glycerol | 5.0 | 5.0 | 25.0 | — | 5.0 |
| | Diethylene glycol | — | — | — | — | — |
| | Glucose | — | — | — | — | — |
| Others | N-Methyl-2-pyrrolidone | — | 10.0 | — | — | — |
| | 2-Pyrrolidone | 10.0 | — | — | — | 10.0 |
| | Triethanolamine | 0.5 | 0.5 | 0.5 | 0.5 | 0.5 |
| | Triethylene glycol monoethyl ether | — | — | 10.0 | 10.0 | 10.0 |
| | Surfynol 466 | — | — | — | 0.5 | — |
| | Ultrapure water | Balance | Balance | Balance | Balance | Balance |

TABLE 2

| | | Ink composition | |
|---|---|---|---|
| | Component | Black ink | Cyan ink |
| Pigment | Carbon black MA7 | 5.0 | — |
| | C.I. Pigment Blue 15:3 | — | 2.0 |
| Dispersant | Styrene-acrylic acid copolymer (resin content: 40%) | 1.0 | 1.0 |
| Resin emulsion | Boncoat 4001 (resin content: 50%) | 5.0 | 5.0 |
| Others | Glycerol | 15.0 | 15.0 |
| | Ethylene glycol | 5.0 | 5.0 |
| | 2-Pyrrolidone | 5.0 | 5.0 |
| | Triethanolamine | 0.8 | 0.8 |
| | Potassium hydroxide | 0.1 | 0.1 |
| Water | Ultrapure water | Balance | Balance |

* Carbon black MA7, manufactured by Mitsubishi Chemical Corporation
* Boncoat 4001: Acrylic resin emulsion, manufactured by Dainippon Ink & Chemicals, Inc.

[Evaluation 1: Application Property]
Solid patterns were printed on the coated paper with the printer using the reaction liquids with the amount of each reaction liquid ejected per unit area being 1 g/m². Immediately after printing, the application states of the reaction liquids were visually observed. The application states were evaluated according to evaluation criteria described below.
A: Evenly applied
C: Unevenly applied
[Evaluation 2: Feathering]
Solid patterns were printed on the coated paper with the printer using the reaction liquids with the amount of each reaction liquid ejected being 0.5 g/m². The black ink composition was then used to print letters with a size of 6 point. The printing was performed with the amount of the black ink composition ejected being 20 ng/dot. The printing using the reaction liquids and the black ink was performed in a single pass. After the resulting prints were allowed to stand at 25° C. for 24 hours, the prints were inspected for feathering in the letters.
A: Sharp print without any feathering
B: Feathering observed
C: Remarkable feathering to render the outline of the letter blurry
[Evaluation 3: Color Bleeding]
Solid patterns were printed on the coated paper with the printer using the reaction liquids with the amount of each reaction liquid ejected being 0.5 g/m². Patch patterns were then printed using the cyan ink composition at a print duty of 80%. Simultaneously, letters with a size of 6 point were printed on the patch patterns using the black ink with the amount of the black ink composition ejected being 20 ng/dot. The printing using the reaction liquids, the cyan ink composition, and the black ink composition was performed in a single pass. The prints were examined for the presence of uneven color-to-color mixing in the letter boundaries.
A: No color-to-color mixing observed with clear letter boundaries.
B: Feather-like color-to-color mixing observed.
C: Significant color-to-color mixing observed rendering the outline of the letter blurry.
[Evaluation 4: Unevenness of Printing]
Solid patterns were printed on the coated paper with the printer using the reaction liquids with the amount of each reaction liquid ejected being 0.5 g/m². Then solid patterns were printed thereon using the cyan ink composition at a print duty of 100%. After the prints were allowed to stand at 25° C. for 24 hours, OD values of any five points of each print were measured with Spectrolino (manufactured by Gretag). The maximum value and the minimum value of the five OD values were determined. The difference between the maximum value and the minimum value was calculated. Evaluation was made according to evaluation criteria described below.
A: The difference between the maximum value and the minimum value was less than 0.2.
B: The difference between the maximum value and the minimum value was 0.2 or more and less than 0.4.

C: The difference between the maximum value and the minimum value was 0.4 or more.

[Evaluation 5: Abrasion Resistance]

Printing was performed on the coated paper with an apparatus which included an inkjet head used in the printer described above and which had a structure shown in FIG. 6. After solid patterns were printed using the reaction liquids with the amount of each reaction liquid ejected being 0.5 g/m$^2$, solid patterns were printed using the cyan ink composition at a print duty of 100% (samples X: without heating). Then the prints were heated to 70° C. with the heater 14 to form heated prints (samples Y: heated). The prints were allowed to stand at 25° C. The printed portions of samples X and Y were rubbed with a finger 2 hours and 8 hours after printing. The states of the printed portions and whether ink was attached to the finger or not were visually inspected. The abrasion resistance including the drying property was evaluated according to the evaluation criteria described below.

A: The printed surface was not changed, and the ink was not attached to the finger.

B: Although the ink on the printed surface was slightly rubbed off, the ink was not attached to the finger.

C: The ink on the printed surface was rubbed off and attached to the finger.

[Evaluation 6: Storage Stability]

The reaction liquids were placed in glass bottles. The bottles were hermetically sealed and then were allowed to stand at 40° C. for 2 weeks. The reaction solutions after the standing were visually examined for the presence or absence of foreign matter (suspended matter or precipitates). The reaction liquids free from foreign matter were examined for the change in physical properties (viscosity, surface tension, and pH). The storage stability was evaluated according to the evaluation criteria described below.

A: No foreign matter was observed, and the physical properties were not changed.

B: Foreign matter was not observed, but the physical properties were slightly changed.

C: Foreign matter was observed or the physical properties were significantly changed.

[Evaluation 7: Ejection Stability]

Each reaction liquid was charged into the printer. Images including characters and graphics were continuously printed on paper of size A4. When a "trajectory directionality problem" or "dropouts" occurred during printing, a cleaning operation was performed. In the case where the "trajectory directionality problem" or "dropouts" was not solved even when the cleaning operation was performed, the number of prints printed was counted. From the results, the ejection stability was evaluated according to the evaluation criteria described below.

A: The number of prints until the trajectory directionality problem was not solved was 10,000 or more.

B: The number of prints until the trajectory directionality problem was not solved was 5,000 or more and less than 10,000.

C: The number of prints until the trajectory directionality problem was not solved was less than 5,000.

[Evaluation 8: Recoverability from Clogging]

Each reaction liquid was charged into the printer. Printing was performed to make sure that the reaction liquid was properly ejected from all nozzles and then stopped. The head of the printer was allowed to stand at 40° C. for 24 hours without being capped. Then the number of cleaning operations required to eject the reaction liquid from all nozzles was measured. From the results, the recoverability from clogging was evaluated according to the evaluation criteria described below.

A: All nozzles were recovered within 2 times of the cleaning operations.

B: All nozzles were recovered after 3 to 6 times of the cleaning operations.

C: All nozzles were not recovered after 6 times of the cleaning operations.

Table 3 shows the evaluation results described above.

TABLE 3

|  | Example 1 | Example 2 | Example 3 | Example 4 | Example 5 | Example 6 | Example 7 |
|---|---|---|---|---|---|---|---|
| Evaluation 1: Application property | A | A | A | A | A | A | A |
| Evaluation 2: Feathering | A | A | A | A | B | A | A |
| Evaluation 3: Color bleeding | A | A | A | B | B | A | A |
| Evaluation 4: Unevenness of printing | A | A | A | A | A | A | A |
| Evaluation 5: Abrasion Resistance — Sample X, 2 hours after printing | B | A | B | B | B | A | A |
| 8 hours after printing | A | A | A | A | A | A | A |
| Sample Y, 2 hours after printing | A | A | A | A | A | A | A |
| 8 hours after printing | A | A | A | A | A | A | A |
| Evaluation 6: Storage stability | A | A | A | A | A | A | A |
| Evaluation 7: Ejection stability | A | A | A | A | A | A | A |
| Evaluation 8: Recoverability from clogging | A | A | A | A | A | A | B |

|  | Example 8 | Example 9 | Comparative Example 1 | Comparative Example 2 | Comparative Example 3 |
|---|---|---|---|---|---|
| Evaluation 1: Application property | A | A | C | C | C |
| Evaluation 2: Feathering | A | A | C | A | C |
| Evaluation 3: Color bleeding | A | A | B | A | C |
| Evaluation 4: Unevenness of printing | B | A | C | C | B |
| Evaluation 5: Abrasion Resistance — Sample X, 2 hours after printing | B | B | C | C | C |
| 8 hours after printing | B | A | C | C | C |
| Sample Y, 2 hours after printing | A | A | C | B | B |
| 8 hours after printing | A | A | C | B | B |
| Evaluation 6: Storage stability | A | A | A | A | A |
| Evaluation 7: Ejection stability | A | A | C | C | A |
| Evaluation 8: Recoverability from clogging | A | A | A | C | A |

INDUSTRIAL APPLICABILITY

The present invention has industrial applicability as an inkjet recording method in which two liquids are printed and which can perform inkjet ejection and a recording product, in which the inkjet recording method provides a high-quality image free from feathering, color bleeding, uneven printing, and the like using a reaction liquid having excellent storage stability, ejection stability, and recoverability from clogging on a recording medium having an absorbing layer of a paper support with low water absorption, and the recording product has excellent abrasion resistance.

REFERENCE NUMERALS

1: recording head, 2: ink tank, 3: ink tube, 21: first liquid ejection nozzles, 22, 23, 24, 25: ink composition ejection nozzles, 31: first liquid-deposited region, 32: print region

The invention claimed is:

1. An inkjet recording method comprising the steps of
depositing a reaction liquid onto a recording medium and then
depositing an ink composition onto the recording medium to perform printing,
wherein the recording medium has an absorbing layer of a paper support in which the amount of water absorbed within 30 msec$^{1/2}$ from the start of contact in the Bristow method is 30 ml/m$^2$ or less,
the reaction liquid contains a polyether-modified polysiloxane-based compound, at least one polyvalent metal salt, a long-chain alkyl glycol ether containing 5 to 8 carbon atoms in the alkyl chain, and a 1,2-alkanediol and
the ink composition contains water, a colorant, and resin emulsion particles.

2. The inkjet recording method according to claim 1, wherein the polyvalent metal salt is at least one selected from sulfate, nitrate, and carboxylate.

3. The inkjet recording method according to claim 1, wherein the polyether-modified polysiloxane-based compound is a polyether-modified polysiloxane-based compound represented by formula (1):

[Chem. 1]

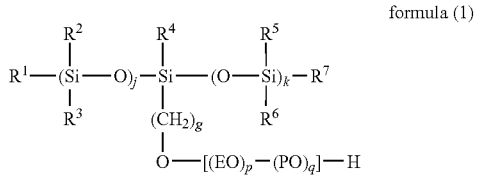

formula (1)

wherein in formula (1), $R^1$ to $R^7$ each independently represent an alkyl group having 1 to 6 carbon atoms, j, k, and g each independently represent an integer of 1 or more; EO represents an ethyleneoxy group; PO represents a propyleneoxy group; and p and q each represent an integer of zero or more, provided that p+q represents an integer of 1 or more, any order of EO and PO in brackets may be used, and EO and PO may be arranged in a random or block fashion.

4. The inkjet recording method according to claim 1, wherein the long-chain alkyl glycol ether is ethylene glycol mono-n-hexyl ether, diethylene glycol mono-n-hexyl ether, triethylene glycol mono-n-hexyl ether, propylene glycol mono-n-butyl ether, dipropylene glycol mono-n-butyl ether, or tripropylene glycol mono-n-butyl ether.

5. The inkjet recording method according to claim 1, wherein the proportion of the long-chain alkyl glycol ether in the reaction liquid is 10% by weight or less.

6. The inkjet recording method according to claim 1, wherein the reaction liquid further contains a polyhydric alcohol and/or a saccharide as a humectant, and wherein the proportion of the polyhydric alcohol and/or saccharide in the reaction liquid is in the range of 0.1% to 10% by weight.

7. The inkjet recording method according to claim 1, wherein the colorant in the ink composition is a pigment.

8. The inkjet recording method according to claim 1, further comprising the step of heating the recording medium having the reaction liquid and/or the ink composition at 40° C. to 150° C.

* * * * *